Sept. 17, 1963 W. D. ROWE 3,104,327

MEMORY CIRCUIT USING NOR ELEMENTS

Filed Dec. 14, 1956 2 Sheets-Sheet 1

WITNESSES

Edwin E. Bassler

Leon J. Laza

INVENTOR

William D. Rowe

BY F. E. Browder

ATTORNEY

Sept. 17, 1963 W. D. ROWE 3,104,327

MEMORY CIRCUIT USING NOR ELEMENTS

Filed Dec. 14, 1956 2 Sheets-Sheet 2

United States Patent Office 3,104,327
Patented Sept. 17, 1963

3,104,327

MEMORY CIRCUIT USING NOR ELEMENTS

William D. Rowe, Pittsburgh, Pa., assignor to Westinghouse Electric Corporation, East Pittsburgh, Pa., a corporation of Pennsylvania Filed Dec. 14, 1956, Ser. No. 628,330
3 Claims. (Cl. 307—88.5)

The invention relates generally to control systems and, more particularly, to memory elements for control systems.

An object of the invention is to provide an element for a control system which will store a signal for a predetermined time and, upon the establishment of the predetermined circuit connections, deliver the signal.

It is also an object of the invention to provide for so interconnecting a plurality of NOR circuit elements that they will function as a flip-flop circuit element.

Other objects of the invention will, in part, be obvious and will, in part, appear hereinafter.

A flip-flop circuit is provided utilizing two NOR circuit elements in combination whereby an input at one or the other NOR circuit element or both will control the output state of the flip-flop in a manner utilizing the unique characteristics of both the transistor and the NOR circuit elements.

For a fuller understanding of the nature and objects of the invention, reference should be had to the following detailed description taken in connection with the accompanying schematic diagrams, in which.

Figure 1:
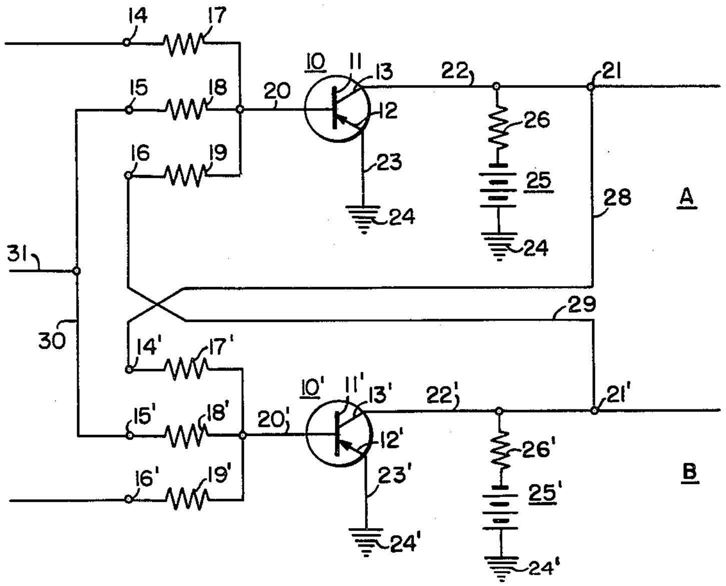
FIGURE 1 is a diagram of two NOR circuit elements connected to one another to make a memory circuit element in accordance with the teachings of this invention.

Referring now to the drawing and FIG. 1 in particular, the schematic diagram illustrates two NOR circuits elements, such as disclosed in and defined my copending application Serial No. 628,332, filed December 14, 1956 and entitled, NOR Element for Control Systems, connected to one another. These NOR circuit elements will be identified generally as circuit elements A and B. The manner in which the NOR circuit elements are connected to one another will be described hereinafter.

The NOR circuit element A comprises a transistor shown generally at 10 and a plurality of circuit connections. The transistor is provided with a base electrode 11, emitter 12 and a collector 13. As shown, a plurality of input terminals 14, 15 and 16 are provided for the transistor. The input terminals 14, 15 and 16 are connected to the base electrode 11 through impedances 17, 18 and 19, respectively. The input terminals may be connected directly to the base electrode through the impedances. However, in this case, for convenience in illustration, the input terminals are connected to the base electrode 11, through the conductor 20.

An output terminal 21 is connected through conductor 22 to the collector 13 of the transistor 10. The emitter 12 is connected through conductor 23 to ground at 24.

In order to impress a predetermined bias on the collector 13, a source of power, shown generally at 25, is provided. Any suitable power source which will supply a predetermined voltage may be utilized. In this instance for convenience in illustration, a storage battery is provided. The negative terminal of the battery 25 is connected through an impedance 26 to the collector 22. The other, or positive, terminal of the battery is grounded at 24 to provide a return.

The other NOR circuit element B is provided with exactly the same elements as the NOR circuit element described hereinbefore. Therefore, like elements will be given corresponding numbers but with the legend "prime" following. The functioning of a NOR circuit element may be described generally by saying that when there is no input signal, there will be an output, but when there are one or more input signals there will be no output. This has been described in detail in the hereinabove identified copending application defining and in detail disclosing a NOR circuit element.

In this NOR circuit there is an output at terminal 21 only if there is neither an input at terminal 14, nor an input at terminal 15, nor an input at terminal 16. The key word in this statement is the word "nor," which expresses both a logical operation and a negation. This circuit is, therefore, termed a NOR circuit, and the logic will be called NOR logic. This logic indicates that NOR logic elements, as herein disclosed, and disclosed in hereinbefore mentioned copending application, can be utilized to provide all the combinations of logic (except time delays) that can be effected by AND, OR and NOT logic circuits. The combination of NOR circuits herein disclosed utilizes two NOR circuits in combination to provide a flip-flop, or memory device.

In connecting the two NOR circuit elements to one another, the output terminal 21 of NOR circuit element A is connected through conductor 28 to the input terminal 14', of the second NOR circuit element B, and the output terminal 21' of the second NOR circuit element B is connected to the input terminal 16 of the first NOR circuit element A. In addition, the terminals 15 and 15' of the two NOR circuit elements are connected to one another by the conductor 30. The conductor 30 may be connected to any source of power for delivering a signal through the conductor 31. Since the terminals 15 and 15' are connected to a common signal source through conductor 31, a signal may be delivered to them simultaneously.

In operation, if no signals have been delivered to the input terminals, then one of the NOR circuit elements (A or B) will deliver an output. The state of the NOR circuit elements is not determined at the moment. Assume now that a signal is delivered through the terminal 14 and resistor 17 and that it drives the transistor 10 to saturation. Since this transistors is driven to saturation, it will become highly conductive and current will flow from the positive ground, through conductor 23, the emitter 12, base electrode 11, collector 13, conductor 22, impedance 26, battery 25 back to ground at 24. The voltage on the output terminal 21 will thus be so low that no output is delivered.

When no output is delivered at the terminal 21, there is no input to the base 11' of transistor 10' from 21 through conductor 28, terminal 14', resistor 17' and conductor 20' and the transistor 10' no longer stands saturated and consequently, offers a very high resistance to the flow of current. Voltage is immediately built up across the output terminals and an output is delivered through the output terminal 21', conductor 29 to the input terminal 16, resistor 19, conductor 20 to the base 11 of transistor 10 of he NOR circuit element A. If the signal through the terminal 14 is now discontinued, the first NOR circuit element will remain in the condition to which it was driven by a signal through the terminal 14. This results from the fact that the NOR circuit element B is delivering an output to the transistor 10, which means that the first NOR circuit element will no longer deliver an output and it will remain in the state to which it has been driven by the signal through the input terminal 14.

Assuming now that a signal is delivered to the B NOR circuit element through the terminal 16′, this will drive the transistor 10′ to saturation rendering it highly conductive. Current will then flow from the positive ground 24′ through conductor 23′, the emitter 12′, base electrode 11′, collector 13′, conductor 22′, impedance 26′, the battery 25′ and back to ground at 24′. The output voltage drops and no output is delivered. Therefore, the A NOR circuit element will not receive a signal and the transistor 10 will return to its original state offering high resistance to the flow of current. The voltage on the terminal 21 will be built up and an output delivered. When there is an output on the A NOR circuit element, a current will flow from the output terminal 21 through conductor 28 to the input terminal 14′, of the B NOR circuit transistor. The transistor 10′ will now be driven to saturation and current will flow from the positive ground 24′, through conductor 23′, emitter 12′, base electrode 11′, electrode 13′, conductor 22′, impedance 26′, the battery 25′, and back to ground at 24′. As in the previous alternate state, when input at 16′ is interrupted the circuit still remains in the stable state to which it was driven by the signal through input 16′.

Assuming now that a signal is delivered through conductor 31 and that both of the transistors 10 and 10′ are driven to saturation, then the output voltages at 21 and 21′ will both drop and no outputs will be delivered. Consequently, when the signal though conductor 31 is interrupted, the transistors 10 and 10′ will become highly resistive and voltages will be built up at either output terminal 21 or 21′. When output voltages appear at either of the terminals 21 or 21′, one NOR circuit element will deliver a signal to the other and the flip-flop circuit element wil remain in the state that follows such signal delivery until the next signal is received through the input terminals.

In the flip-flop circuit illustrated in FIG. 1, if we ignore unstable transitional states we can set up three stable states. These stable states follow from the description of the circuit system described hereinbefore in connection with FIG. 1.

These stable states are:

(1) Input Zero—Output A One, Output B Zero
(2) Input Zero—Output A Zero, Output B One
(3) Input One—Output A Zero, Output B Zero The third stable state comes from delivering an activating signal impulse to both NOR circuit elements simultaneously through the conductors 30 and 31. However, the provision of means for delivering a signal to both NOR circuit elements simultaneously is not necessary in order to make a flip-flop element but may be added to provide the third stable state.

Consider the first two states in connection with the circuit system of FIG. 1. If as in state one there is no input to NOR circuit element A, then the transistor 10 offers a very high resistance to the flow of current through it. Therefore, the power source 25, will impress a voltage across the output terminals and it may be assumed that the output from terminal 21 of the NOR circuit element A is one.

If, as in state two, there is zero input to NOR circuit element B, the transistor 10′ will not be rendered highly conductive. Therefore, it maintains a high resistance in its circuits. Consequently, the power source 25′ will impress a voltage across the output terminals and it will be assumed that the output from the NOR circuit element B at terminal 21′ is one.

In the third state of the flip-flop system a signal is delivered through conductor 31 to input terminals 15 and 15′ of the NOR circuit elements A and B, simultaneously. The signal through terminal 15 drives the transistor 10 to saturation rendering it highly conductive. Current from the power source 25 now flows through the transistor. The voltage drops at the output terminal 21 and the output becomes zero. This same signal also drives the transistor 10′ to saturation, rendering it highly conductive. Current now flows from power source 25′ through the transistor 10′. The voltage at the output terminal 21′ drops and the output becomes zero. The third state will last for the duration of the input signal through the conductor 31.

Figure 2:
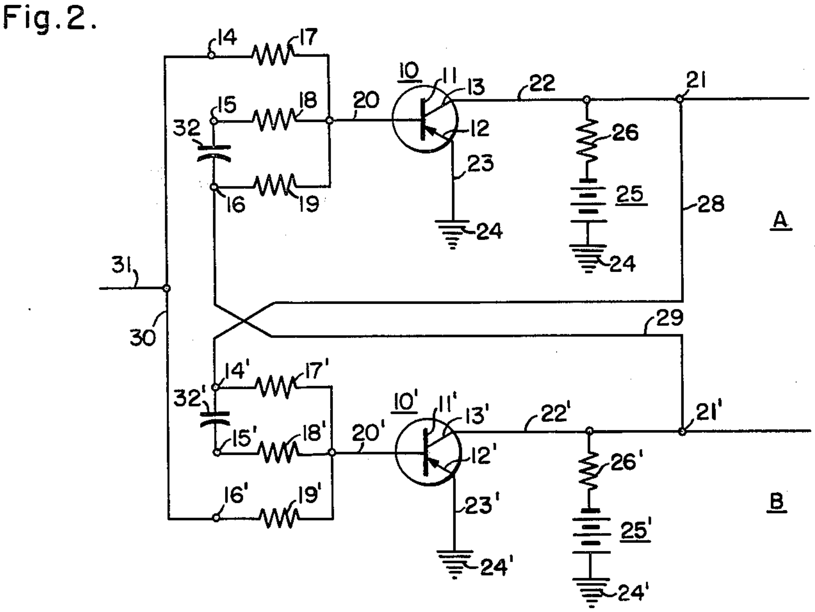
FIG. 2 is a diagram of two NOR circuit elements connected to one another to make a flip-flop element and provided with means for predetermining which NOR circuit element of the alternating system will receive the stored signal.

Referring now to FIG. 2, two NOR circuit elements, shown generally at A and B, similar to the corresponding NOR circuit elements shown in FIG. 1, are employed. Since the elements of the NOR circuit elements A and B of FIG. 2 are similar to those shown in FIG. 1, corresponding parts will be given the same reference numerals.

The modification of the circuits shown in FIG. 2 involves connecting the input terminal 14 of NOR circuit element A to input terminal 16′ of NOR circuit element B by a conductor 30. A conductor 31 is provided for delivering a signal impulse through conductor 30 to the two input terminals 14 and 16′ simultaneously. In addition, a capacitor 32 is connected between the input terminals 15 and 16 while a capacitor 32′ is connected between the input terminals 14′ and 15′. Since, as pointed out in the specification hereinbefore, PNP transistors are employed, the negative terminals of the capacitors 32 and 32′ will be connected to the output terminals 21′ and 21, respectively.

The circuit system of FIG. 1 is converted into a binary counter circuit system as shown in FIG. 2 by the addition of the capacitors 32 and 32′. Now in addition to the three stable states explained hereinbefore in connection with the flip-flop circuit provided with means for delivering a signal to both NOR circuits A and B simultaneously, the binary counter system exhibits a time delay characteristic. The addition of the time delay characteristic enables the binary counter circuit to remember its preceding stable state and when the next input pulse is received go to its alternate state. The time delay results from the input resistors and capacitors connected in series circuit relationship.

When the binary circuit system is connected as shown in FIG. 2, an output will result at one of the output terminals 21 or 21′. Assuming now that there is an output at terminal 21 and no output at terminal 21′, then the NOR circuit element B will receive a current through terminal 14′ and resistor 17′ which will drive transistor 10′ to saturation and render it highly conductive. Current will now flow from the power source 25′ through the transistor 10′ and the output at terminal 21′ will drop to zero. In addition to delivering a signal through the terminal 14′ to the transistor 10′, the output from the NOR circuit A will charge the capacitor 32′. Therefore, at the time when the signal is delivered through conductors 31 and 30, the capacitor 32′ is charged.

If a signal impulse is now delivered through the conductors 31 and 30 to the input terminals 14 and 16′ instantaneously, both of the transistors 10 and 10′ will be driven to saturation and will become highly conductive. As described hereinbefore, under such conditions current will flow from the power sources 25 and 25′ through the transistors 10 and 10′ respectively and the output at the terminals 21 and 21′ of the NOR circuits A and B respectively will drop to zero.

In designing this circuit it will be necessary to select capacitors and resistors having a time constant which is longer in point of time than the duration of the input signal through the conductors 31 and 30 which drives the outputs of both of the NOR circuits A and B to zero. Therefore, when the signal delivered terminates, the capacitor 32′ will still be charged to some extent. The positive signal that still remains on the positive side of the capacitor 32′ will tend through the input resistor 18′ to drive the transistor 10′ further into cutoff or a highly resistive state. Since capacitor 32 was not charged at the beginning of the operation, it does not affect transistor 10. Then when the input signal is completed and both transistors 10 and 10′ try to return to a highly resistive state 10′ will be given a favorable boost by capacitor 32′ and will begin to approach the highly resistive state first. The voltage that then begins to build up at output terminal 21′ will drive transistor 10 to saturation preventing an output from 21.

The next pulse received through conductors 31 and 30 will re-establish the third stable state in the manner already described. Then, in general, succeeding pulses cause the binary circuit element to alternate between the first stable state and the second stable state.

As long as the time constant of the capacitor is of longer duration than the input impulse, the circuit will operate in the manner described. In designing the capacitor and controlling the input pulse, it may be necessary to take into account temperature compensating voltages. However, it has been found that the capacitor offers a high margin of tolerance, and a suitable design of a circuit system may readily be effected.

In describing the foregoing operation, it was assumed that prior to the receiving of the signal through the conductors 31 and 30 that NOR circuit A was the last one to have an output. If at the time of receiving the signal the NOR circuit B was the last to have an output, then after the termination of the signal received through the conductors 30 and 31, or the third stable state, the circuit system will go back to a state where the NOR circuit B will deliver an output.

Figure 3:
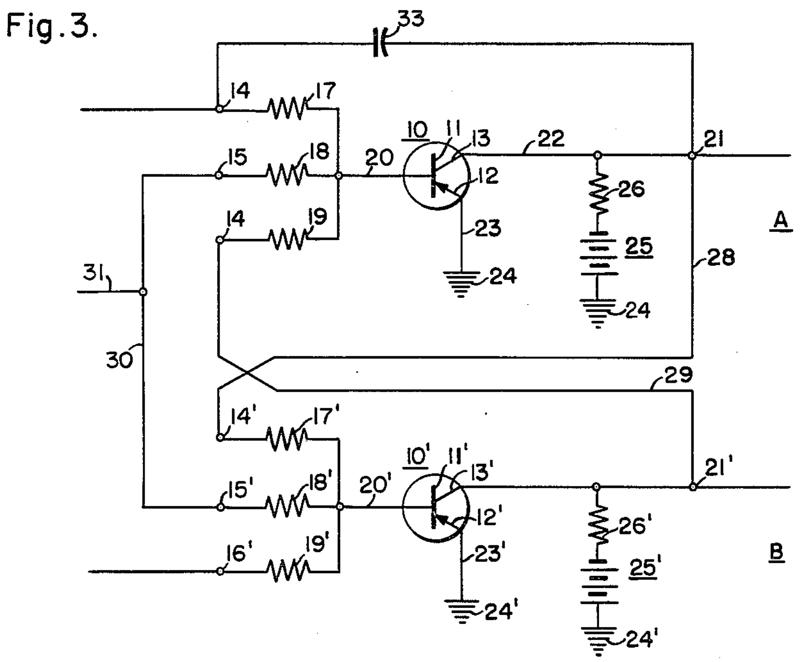
FIG. 3 is a circuit diagram of two NOR circuit elements connected to one another to provide a memory circuit element and means for controlling its functioning.

The circuit system illustrated in FIG. 3 is the same as the circuit system illustrated in FIG. 1 with the exception that a capacitor 33 is connected between the output terminal 21 and the input terminal 14. The connecting of the capacitor 33 in this position will depend on an arbitrary decision of the designer. Instead of connecting it across terminals 14 and 21, it may be connected from terminals 16′ to 21′. Then the functioning of the circuit will be the same with the exception that the NOR circuit A will finish up with an output in one instance while the NOR circuit B will finish up with an output if the alternative connection is made.

Assuming now that prior to the delivery of a signal the NOR circuit A is delivering an output at the output terminal 21, then a current will be delivered from the NOR circuit A through input terminal 14′, resistor 17′ and conductor 20′ to the transistor 10′ of the NOR circuit B. The transistor 10′ will be driven to saturation and current will flow from the source of power 25′ through the transistor 10′. As a result there will be no output at terminal 21′ of the NOR circuit B.

If a signal is now delivered through the conductors 31 and 30, both of the NOR circuits A and B will be driven to zero output. However, before these circuits are driven to zero output the capacitor 33 is charged. When the signal is discontinued the capacitor 33 will carry a charge. Therefore, the positive plate of the capacitor connected through input 14 will tend to drive transistor 10 further into the highly resistive state. Therefore whenever the third stable state ends with the capacitor 33 carrying a charge, the transistor 10 of the NOR circuit element A will always reach the highly resistive state before the transistor 10′ of the NOR circuit element B. When the transistor 10 becomes highly resistive an output will be delivered from output 21 and the transistor 10′ will be driven to a highly conductive state. As explained hereinbefore, when transistor 10′ is highly conductive no output will be delivered from output terminal 21′.

Therefore, in a circuit system such as shown in FIG. 3, when the signal is interrupted the circuit system will go back to the same static circuit condition every time. It will not alternate as it does in the case of the binary counter circuit system illustrated in FIG. 2.

Figure 4:
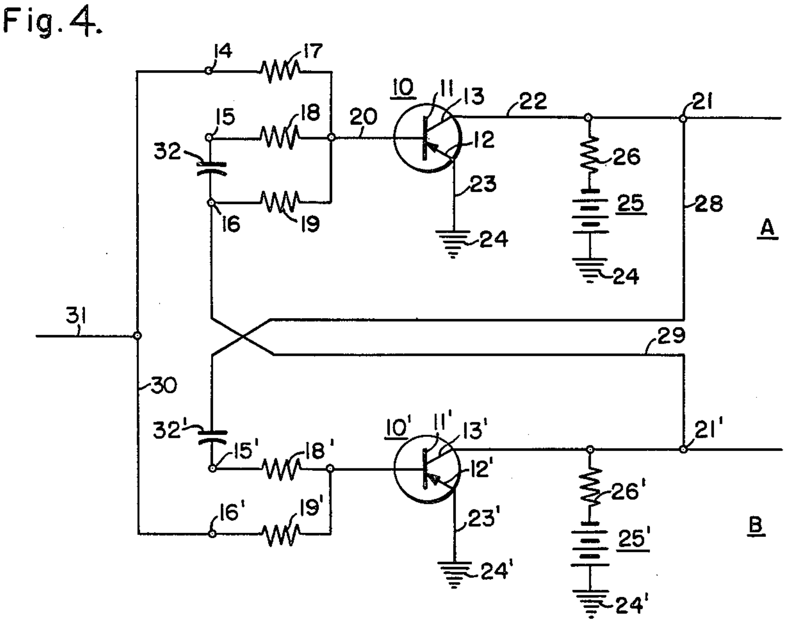
FIG. 4 is a circuit diagram showing another modification of a memory element for a control system.

In the embodiment of the invention illustrated in FIG. 4, it will be observed that the circuit differs from the circuit system illustrated in FIG. 2 in that NOR circuit element B is not provided with an input terminal 14′ and resistor 17′. Therefore, there is no direct feedback circuit from output terminal 21 of NOR circuit element A to the input terminals of NOR circuit element B. As shown, the capacitor 32′ is connected between the input terminal 15′ and the output terminal 21 of the NOR circuit element A. This changes the functioning of the circuit system shown in FIG. 4 from that of the circuit system illustrated in FIG. 2.

Since there is no unobstructed connection between output terminal 21 of NOR circuit element A and the input terminals of NOR circuit element B, the transistor 10′ will not be driven to saturation and there will be an output from the output terminal 21′ which will drive transistor 10 to saturation. When transistor 10 is driven to saturation there will be no output at the output terminal 21. Further, the current flowing from the output terminal 21′ will charge the capacitor 32.

Assume now that a signal impulse is delivered through the conductors 31 and 30 to the input terminal 14 of the NOR circuit element A and the input terminal 16′ of the NOR circuit element B. Then the transistors 10 and 10′ are both driven to saturation and rendered highly conductive. Circuits will be established from the power sources 25 and 25′ through the transistors 10 and 10′ respectively. Therefore, there will be no outputs at terminals 21 and 21′.

Assume now that the signal through the conductors 31 and 30 to the NOR circuit elements A and B is interrupted. At this time there are no outputs at the terminals 21 and 21′, but the capacitor 32 is charged and will impose a positive potential on the transistor 10.

Therefore, as soon as the signal through the conductors 31 and 30 is interrupted, the capacitor 32 will cause transistor 10 to become highly resistive and substantially no current will flow from the power source 25 through the transistor 10. An output voltage will now appear at the output terminal 21. Current will flow from the output terminal 21 to the capacitor 32′, building up a charge on the latter.

The charge on the capacitor 32 decays rapidly. The charge on the capacitor 32′ is slowly built up. At some point, the charge on capacitor 32′ will reach a value which will enable it to drive the transistor 10′ to the highly resistive state. As a result an output will be delivered from the output terminal 21′. When 21′ delivers an output, transistor 10 will be driven to saturation rendering it highly conductive and the voltage at 21 will drop to zero and there will be no output. The circuit system of FIG. 4 is now returned to the state in which it stood before the impulse signal was delivered through the conductors 31 and 30. A finite time occurs between the interruption of the signal and the return of the circuit to the state it was in before receiving the signal. This constitutes a time delay the time interval of which is dependent on the rating in farads of the capacitor 32′ and the ohmic value of the input resistors.

Therefore, it will be evident that circuits may be designed to perform the functions required. The circuits will not be dependent upon the characteristics of special materials.

Since certain changes may be made in the above construction and different embodiment of the invention could be made without departing from the scope thereof, it is intended that all matter contained in the above description or shown in the accompanying diagrams shall be interpreted as illustrative and not in a limiting sense.

I claim as my invention:

1. In a memory device for systems of control, in combination, a pair of NOR circuit elements each NOR circuit element comprising a transistor having a grounded emitter electrode, a base electrode, and a collector electrode, a plurality of input terminals for receiving a plurality of independent input signals, a plurality of impedances, each of said input terminals being connected through one of said impedances to said base electrode, said collector electrode having an output terminal, and an impedance and source of potential connected between the output terminal and ground to provide an output when the transistor is in its non-conductive state by reason of the absence of an input signal to its input terminals, circuit means for connecting one input terminal of one transistor to an input terminal of another transistor to thus provide means for delivering an input signal to an input terminal of each transistor simultaneously, circuit means cross-connecting the output of each transistor to the input of the other transistor, a capacitor connected between two input terminals of one transistor, said two interconnected input terminals being connected to the output terminal of the second transistor, and another capacitor connected between the output terminal of the one transistor and an input terminal of the second transistor.

2. In a memory device for systems of control, in combination, a pair of NOR circuit elements, each NOR circuit element comprising a transistor having a grounded emitter electrode, a base electrode, and a collector electrode, a plurality of input terminals, for receiving a plurality of independent input signals a plurality of impedances, each of said input terminals being connected through one of said impedances to said base electrode, said collector electrode having an output terminal, and an impedance and source of potential connected between the output terminal and ground of each transistor to provide an output from each transistor when the transistor is in its non-conductive state by reason of the absence of an input signal to its input terminals, circuit means for connecting one input terminal of one transistor to an input terminal of another transistor to thus provide means for delivering an input signal to an input terminal of each transistor simultaneously, and circuit means cross-connecting the output of each transistor to an input terminal of the other transistor, a capacitor connected between two input terminals of one transistor, said two interconnected input terminals being connected to the output terminal of the second transistor, and another capacitor connected between the output terminal of the one transistor and an input terminal of the second transistor.

3. In a memeory device for systems of control, in combination, a pair of NOR circuit elements, each NOR circuit element comprising a transistor having a grounded emitter electrode, a base electrode, and a collector electrode, a plurality of input terminals for receiving inputs, a plurality of impedances, each of said input terminals being connected through one of said impedances to said base electrode, said collector electrode having an output terminal, and an impedance and source of potential connected between the output terminal and ground to provide an output when the transistor is in its non-conductive state by reason of the absence of an input at its input terminals, circuit means cross-connecting the output of each transistor to an input terminal of the other transistor, and means connecting one input terminal of one transistor to an input terminal of another transistor to simultaneously provide an input to an input terminal of each transistor rendering each conductive for the duration of the input at such commonly connected input terminals.

References Cited in the file of this patent

UNITED STATES PATENTS

| | | |
|---|---|---|
| 2,503,662 | Flowers | Apr. 11, 1950 |
| 2,603,746 | Burkhart | July 15, 1952 |
| 2,611,824 | Van Durren | Sept. 23, 1952 |
| 2,622,212 | Anderson | Dec. 16, 1952 |
| 2,676,271 | Baldwin | Apr. 20, 1954 |
| 2,735,005 | Steele | Feb. 14, 1956 |
| 2,778,978 | Drew | Jan. 22, 1957 |
| 2,787,712 | Priebe | Apr. 2, 1957 |
| 2,891,172 | Bruce | June 16, 1959 |

OTHER REFERENCES

Wireless Engineering, vol. 32, No. 5, pp. 122–130, May 1955.

Lode: "The Realization of A Universal Decision Element," Journal of Computing Systems, vol. 1, pp. 14–22, 1953.

Richards: Arithmetic Operations in Digital Computers, Van Nostrand, February 1955, pp. 36 and 37.

Vol. 20, "The C–D Capacitor," page 7, July 1955, Cornell-Dubilier Electric Corp., South Plainfield, N.J.

Turner: Transistors, page 28, Gernsback Pub., 1954.

Lewis: Electrical Counting, MacMillan, 1943, pages 90 to 92.

Electronics, vol. 29, No. 5, May 1956, "Transistor Circuits for Digital Computers" by D. E. Deuitch, pages 160–161.